United States Patent
Negri et al.

(10) Patent No.: US 9,934,917 B2
(45) Date of Patent: Apr. 3, 2018

(54) LOCKABLE ROCKER SWITCH, AN ELECTRICAL CIRCUIT INCLUDING SUCH A LOCKABLE ROCKER SWITCH, AND METHODS FOR UNLOCKING AND LOCKING SUCH A LOCKABLE ROCKER SWITCH

(71) Applicant: VOLVO TRUCK CORPORATION, Gothenburg (SE)

(72) Inventors: Olivier Negri, Saint Priest (FR); Remi Barrellon, Simandres (FR)

(73) Assignee: Volvo Truck Corporation, Göteborg (SE)

( * ) Notice: Subject to any disclaimer, the term of this patent is extended or adjusted under 35 U.S.C. 154(b) by 123 days.

(21) Appl. No.: 15/036,421

(22) PCT Filed: Nov. 29, 2013

(86) PCT No.: PCT/IB2013/003085
§ 371 (c)(1),
(2) Date: May 13, 2016

(87) PCT Pub. No.: WO2015/079280
PCT Pub. Date: Jun. 4, 2015

(65) Prior Publication Data
US 2016/0293359 A1    Oct. 6, 2016

(51) Int. Cl.
*H01H 9/00*    (2006.01)
*H01H 23/12*    (2006.01)
(Continued)

(52) U.S. Cl.
CPC ............. *H01H 23/12* (2013.01); *B60R 16/02* (2013.01); *H01H 3/20* (2013.01); *H01H 23/00* (2013.01)

(58) Field of Classification Search
CPC ........................... F16B 2/16; B60K 2350/941
(Continued)

(56) References Cited

U.S. PATENT DOCUMENTS 4,026,134 A * 5/1977 Woolfson ............ E05B 47/0044
 70/276
4,045,650 A * 8/1977 Nestor ................... H01H 1/403
 200/243

(Continued)

FOREIGN PATENT DOCUMENTS

DE  20 2013 004033 U1    8/2013
EP      0 571 311 A1    11/1993
EP      1 876 622 A1     1/2008

OTHER PUBLICATIONS

International Search Report (Aug. 22, 2014) for corresponding International App. PCT/IB2013/003085.

*Primary Examiner* — Shawki S Ismail
*Assistant Examiner* — Lisa Homza
(74) *Attorney, Agent, or Firm* — WRB-IP LLP (57) ABSTRACT

A lockable rocker switch includes a fixed part, a rotatable part rotating between a first and a second rotation position, a magnetically actuatable locking component movable between a locking position so as to prevent rotation of rotatable part and a release position, so that rotatable part may rotate. The lockable rocker switch further includes a control component movable onto the rotatable part between a control position, for causing a magnetic action urging the locking component towards the release position, and a rest position, stopping the magnetic action.

28 Claims, 5 Drawing Sheets

(51) Int. Cl.
*H01H 3/20* (2006.01)
*H01H 23/00* (2006.01)
*B60R 16/02* (2006.01)

(58) Field of Classification Search
USPC .......................................................... 335/205
See application file for complete search history.

(56) References Cited

U.S. PATENT DOCUMENTS

| | | | | |
|---|---|---|---|---|
| 4,345,121 | A * | 8/1982 | Tenner | H01H 27/00 200/315 |
| 4,440,994 | A * | 4/1984 | Nat | H01H 27/00 200/323 |
| 4,463,228 | A * | 7/1984 | Osika | H01R 13/70 200/43.02 |
| 4,767,895 | A * | 8/1988 | Parrish | H01H 27/00 200/339 |
| 5,508,479 | A * | 4/1996 | Schooley | H01H 9/0214 200/18 |
| 5,685,183 | A | 11/1997 | Hattori et al. | |
| 7,265,470 | B1 | 9/2007 | Paden et al. | |
| 2008/0190746 | A1 * | 8/2008 | Gauzin | H01H 3/20 200/43.16 |

* cited by examiner

LOCKABLE ROCKER SWITCH, AN ELECTRICAL CIRCUIT INCLUDING SUCH A LOCKABLE ROCKER SWITCH, AND METHODS FOR UNLOCKING AND LOCKING SUCH A LOCKABLE ROCKER SWITCH

BACKGROUND AND SUMMARY

The present invention relates to a lockable rocker switch, for instance a lockable rocker switch suitable for an electrical circuit supplying power to one or several electrical component(s) of a motor vehicle. Furthermore, the present invention relates to an electrical circuit for supplying power to one or several electrical component(s) of a motor vehicle. Besides, the present invention relates to an unlocking method for unlocking such a lockable rocker switch and to a locking method for locking such a lockable rocker switch.

Document U.S. Pat. No. 5,685,183A discloses a locking device having a fixed part, a rotatable part which can rotate with respect to the fixed part between first and second rotation positions, a magnetic lock movable so as to engage and lock together the fixed part and the rotatable part and conversely, to release them.

A main drawback of the lockable rocker switch of U.S. Pat. No. 5,685,183A is that it requires numerous components to perform its functions, which render this locking device quite cumbersome and tedious to lock and unlock.

It therefore appears that, from several standpoints, there is room for improvement in the lockable rocker switches, in particular for an electrical circuit of a vehicle.

It is desirable to provide a lockable rocker switch which is compact, reliable and easy to handle.

A subject-matter of the invention is a lockable rocker switch including at least:
- a fixed part defining a rotation pathway;
- a rotatable part arranged to rotate along said rotation pathway at least between a first rotation position and a second rotation position about a rotation axis;
- a locking component which is magnetically actuatable and which is arranged to move, with respect to said fixed part, between:
  - at least one locking position, in which said locking component crosses said rotation pathway and engages both said fixed part and said rotatable part so as to prevent rotation of said rotatable part, and
  - at least one release position, in which said locking component lies aside from said rotation pathway, so that said rotatable part may rotate into said rotation pathway; wherein said lockable rocker switch further includes a control component which is attached to said rotatable part and which is movable with respect to said rotatable part at least between:
- a control position, in which said control component causes a magnetic action urging said locking component towards said release position, and
- a rest position, in which said control component stops causing said magnetic action.

Throughout the present application, the expression "magnetic materials" refers to any material able to generate, under a predetermined magnetic force, a magnetic coupling stronger than the forces exerted by the biasing component. Thus, the predetermined magnetic force can move the locking component, possibly against a biasing force exerted by a resilient biasing component. Examples of magnetic materials may, for instance, include ferromagnetic materials.

Thus, such a lockable rocker switch can be compact, reliable and easy to handle, because it only requires the operator to pivot or rock the rotatable part and slide the control component.

According to an embodiment, said locking component in said release position is completely accommodated in said rotatable part, and wherein said locking component in said locking position protrudes partially out of said rotatable part and into said fixed part.

Thus, such accommodation in the rotatable part enables the locking component to quickly and reliably protrude out and across the rotation pathway.

According to an embodiment, said fixed part defines at least one hole which communicates with said rotation pathway, said rotatable part defines at least one other hole, said locking component in said release position being completely accommodated in said at least one other hole, and said locking component in said locking position protrudes partially out of said rotatable part and into said at least one hole of the fixed part.

Thus, such a hole of the fixed part is easy to manufacture in order to receive the locking component.

According to an embodiment, said fixed part defines at least two holes corresponding to said first rotation position and to said second rotation position.

Thus, such holes are easy to manufacture in order to receive the locking component in at least two different positions.

According to an embodiment, said locking component in said release position is arranged to be completely accommodated in said fixed part, and wherein said locking component in said locking position protrudes partially out of said fixed part and into said rotatable part.

Thus, such accommodation in the fixed part enables the locking component to quickly protrude out and across the rotation pathway and so to quickly and reliably stop the rotation of the rotatable part.

According to an embodiment, said rotatable part defines at least one cavity which communicates with said rotation pathway, said fixed part defines at least one other cavity, said locking component in said release position being completely accommodated in said at least one other cavity, and said locking component in said locking position protrudes partially out of said fixed part and into said at least one cavity of said rotatable part.

Thus, such a cavity of the rotatable part is easy to manufacture in order to receive the locking component.

According to an embodiment, said rotatable part defines at least two cavities corresponding to said first rotation position and to said second rotation position.

Thus, such cavities are easy to manufacture in order to receive the locking component in at least two different positions.

According to an embodiment, said control component is designed to be manually movable at least between said control position and said rest position.

Thus, such a control component can be handled easily by an operator.

According to an embodiment, said lockable rocker switch further includes at least one spring arranged to resiliently bias said control component towards said rest position.

Thus, such a spring can automatically return the control component back to its rest position, thus relieving the operator from achieving this step.

According to an embodiment, said control component is movable in translation.

Thus, such a sliding control component is easy to manufacture, assemble and use.

According to an entbodiment, said rotatable part has a substantially flat portion, said control component being movable onto said substantially flat portion and along a rectilinear translation axis.

Thus, such a flat portion is easy to manufacture and facilitates sliding of the control component. Therefore thanks to this arrangement the lockable rocker switch according to the invention is simple from a technical point of view and very reliable.

According to an embodiment, said rectilinear translation axis is orthogonal to said rotation axis.

Thus, such an orthogonal rectilinear translation axis helps designing a lockable rocker switch that is easy to manufacture and to use.

According to an embodiment, said rotatable part includes a substantially cylindrical portion, which has preferably the shape of a half-cylinder, and wherein said rotation pathway has a substantially concave cylindrical surface suitable for rotatably bearing said cylindrical portion.

Thus, such cylindrical portion and surface define an efficient rotation pathway for the rotatable part.

According to an embodiment, said substantially concave cylindrical surface defines at least one guiding slope which is arranged beside a respective hole of said fixed part and which has a progressively increasing mule or curvature towards a respective hole of said fixed part.

Thus, such a guiding slope guides the locking component into a hole of the fixed part, which helps the operator reaching the locking position.

According to an embodiment, said substantially cylindrical portion defines at least one guiding slope which is arranged beside a respective cavity of said rotatable part and which has a progressively increasing angle or curvature towards a respective cavity of said rotatable part.

Thus, such a guiding slope guides the locking component into a cavity of the rotatable part, which helps the operator reaching the locking position.

According to an embodiment, said lockable rocker switch further includes at least one rocker spring arranged to resiliently bias said rotatable part towards said first rotation position.

Thus, such a rocker spring can automatically return the rotatable part in its first rotation position, thus relieving the operator from achieving this step.

According to an embodiment, said lockable rocker switch further includes a resilient biasing component designed to exert a resilient action suitable for moving said locking component into said at least one locking position, said resilient action being weaker than said magnetic action.

Thus, such a rocker spring can automatically return the locking component into a locking position, thus relieving the operator from achieving this step or obviating the need for a specific actuator or design for achieving this step.

According to an embodiment, said locking component is arranged to translate along a lock axis and across said rotation pathway, said lock axis being, preferably perpendicular to said rotation axis and said locking component preferably including a pin with a substantially cylindrical shape.

Thus, such a sliding locking component is easy to manufacture and compact to assemble.

According to an embodiment, said locking component includes a magnetic locking part made of metallic material, for instance steel alloy, and said control component includes a magnetic control part made of a magnetic material, preferably a permanent magnet, so that said control component in said control position exerts said magnetic action on said locking component.

Thus, such materials enable the control component and the locking component to cause the magnetic action.

According to an embodiment, the lockable rocker switch further includes an electromagnetic solenoid arranged, when electrically energized, for exerting said magnetic action on said locking component. According to this embodiment, the lockable rocker switch further includes a control circuit connected to said electromagnetic solenoid and extending at least in said rotatable part in such a manner that the control circuit can cooperate with the control component to electrically energize said electromagnetic solenoid when the control component is in the control position. When the control component is in the control position, the control component allows the control circuit to energize the electromagnetic solenoid. The control component in the control position triggers and therefore causes the magnetic action that urges said locking component towards said release position.

Such an electromagnetic solenoid together with the control circuit can quickly and reliably move the locking component into a locking position.

According to an embodiment, said electromagnetic solenoid is accommodated into said fixed part, said control circuit further extending onto said rotation pathway and into said fixed part in electrical contact with said electromagnetic solenoid.

Thus, such a location of the electromagnetic solenoid and of the control circuit can render the lockable rocker switch quite compact.

According, to an embodiment, said electromagnetic solenoid includes a core including a ferromagnetic material such as a soft ferrous magnetic material, for instance, iron or soft steel.

Thus, such a core permits to make an efficient electromagnetic solenoid.

According to an embodiment, said control component is designed to close said control circuit in said control position.

Thus, such a design facilitates locking of the lockable rocker switch.

According to an embodiment, said control circuit includes a microswitch arranged in said rotatable part such that it is activated by the control component to electrically close said control circuit in order to energize said electromagnetic solenoid when said control component is in the control position.

Thus, such a microswitch arranged in said rotatable part is advantageous in order to design a compact lockable rocker switch.

According to an embodiment, said rotatable part is arranged to rotate into said rotation pathway between at least three rotation positions about said rotation axis, including said first rotation position and said second rotation position.

Thus, with three or more rotation positions, such a lockable rocker switch may drive, for instance, the power supply of several electrical circuits of a motor vehicle.

Besides, a subject-matter of the invention is an electrical circuit, for supplying power to at least one electrical component of a motor vehicle wherein said electrical circuit includes a lockable rocker switch according to the invention, said lockable rocker switch being arranged so that said rotatable part in said first rotation position triggers current supply in said electrical circuit and that said rotatable part in said second rotation position stops triggering current supply in said electrical circuit. The lockable rocker switch is for instance, an ignition lock or an ADR switch lock. The abbreviation ADR means "Agreement concerning the international carriage of Dangerous goods by Road" and an ADR switch lock is a safety switch that is traditionally used to isolate de battery from the electrical circuit of the vehicle.

Thus, such an electrical circuit can be quickly and reliably locked in at least one state.

Another subject-matter of the invention is an unlocking method for unlocking a lockable rocker switch as previously described, the locking method comprising the steps of:
- manually moving the control component from said rest position to the control position;
- magnetically actuating said locking component so as to move said locking component with respect to said fixed part from said at least one locking position to said at least one release position; and
- rotating said rotatable part along said rotation pathway at least between a first rotation position and a second rotation position about a rotation axis.

Thus, such an unlocking method enables an operator to reliably and easily unlock the lockable rocker switch.

Yet another subject-matter of the invention is a locking method for locking a lockable rocker switch as previously described, the locking method comprising the steps of:
- moving said control component from said control, position to said rest position; and
- letting said locking component returning back to said at least one locking position.

Thus, such a locking method enables an operator to reliably and easily lock the lockable rocker switch.

These and other features and advantages of the invention will become apparent upon reading the following description in view of the drawings appended thereto, which represent, as non-limiting examples, embodiments of the subject-matter of the invention.

BRIEF DESCRIPTION OF THE DRAWINGS

The following detailed description of several embodiments of the present invention is better understood when read in conjunction with the appended drawings. However, the invention is not limited to the specific embodiments disclosed herewith.

DETAILED DESCRIPTION

FIGS. 1 to 13 illustrate a lockable rocker switch 1 including a fixed part 2 and a rotatable part 6. Fixed part 2 defines a rotation pathway 4.

Figure 4:
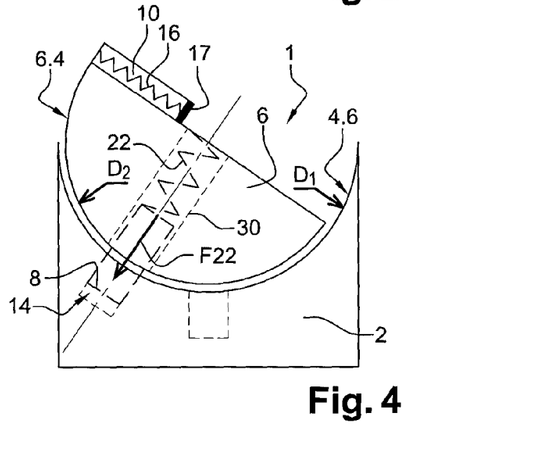
FIG. 4 is a view similar to FIG. 1 of the lockable rocker switch of FIG. 1, where the rotatable part is in a second rotation position, the locking component is in the locking position and the control component is in the rest position.
Figure 5:
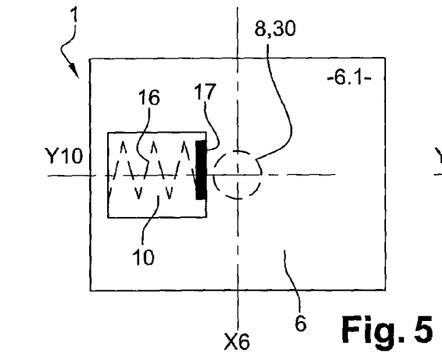
FIG. 5 is a schematic top view, taken along arrow V at FIG. 1, of the lockable rocker switch of FIG. 1, where the control component is in the rest position.
Figure 6:
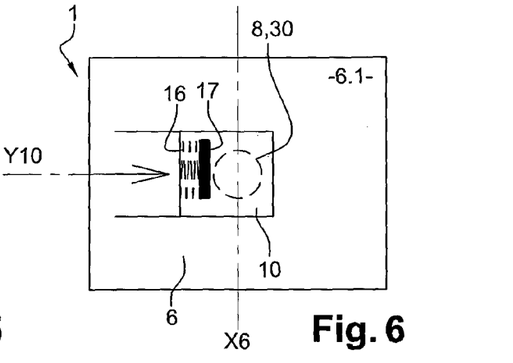
FIG. 6 is view similar to FIG. 5 of the lockable rocker switch of FIG. 1, where the control component is in a control position.

Rotatable part 6 is arranged to rotate along rotation pathway 4 about a rotation axis X6 (visible on FIGS. 5 and 6). Rotatable part 6 is arranged to rotate between a first rotation position (FIGS. 1, 2, 9 and 10) and a second rotation position (FIGS. 3 4, 11 and 12).

Figure 1:
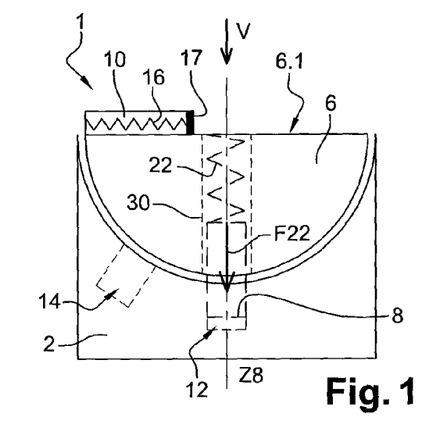
FIG. 1 is a schematic cross-sectional view of a lockable rocker switch according to a first embodiment, where the rotatable part is in a first rotation position, the locking component is in a locking position and the control component is in a rest position.
Figure 2:
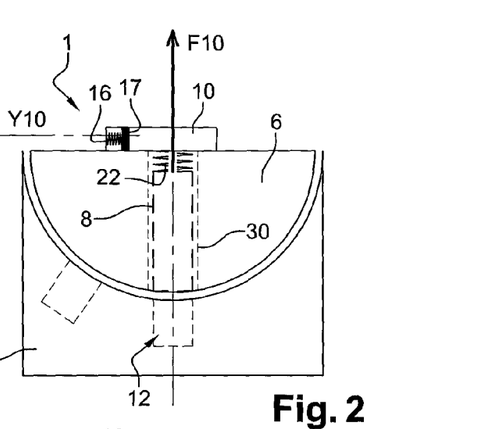
FIG. 2 is a view similar to FIG. 1 of the lockable rocker switch of FIG. 1, where the rotatable part is in the first rotation position, the locking component is in a releasing position and the control component is in a control position.
Figure 3:
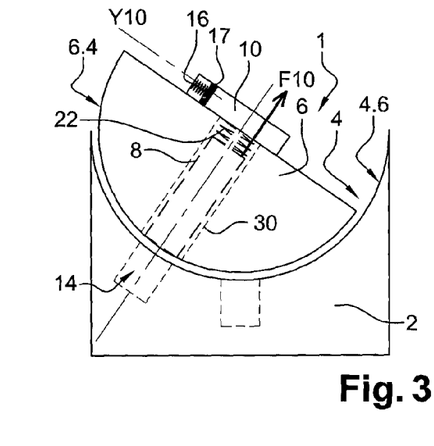
FIG. 3 is a view similar to FIG. 1 of the lockable rocker switch of FIG. 1, where the rotatable part is in the second rotation position, the locking component is in the releasing position and the control component is in the control position.
Figure 8:
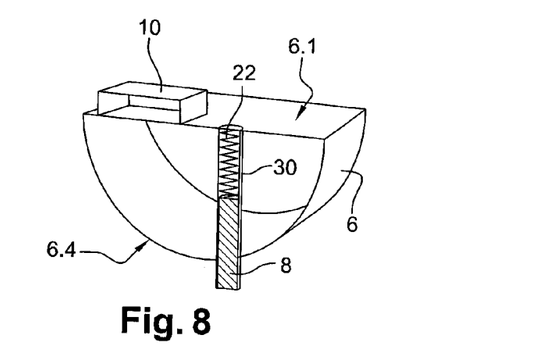
FIG. 8 is a view similar to FIG. 7 of a rotatable part and a control component belonging to the lockable rocker switch of FIG. 1.
Figure 9:
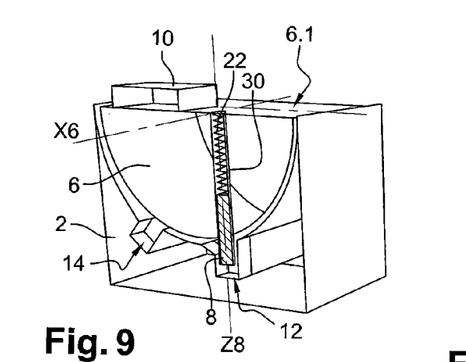
FIG. 9 is a view similar to FIG. 7 of the lockable rocker switch of FIG. 1 in the configuration of FIG. 1.
Figure 10:
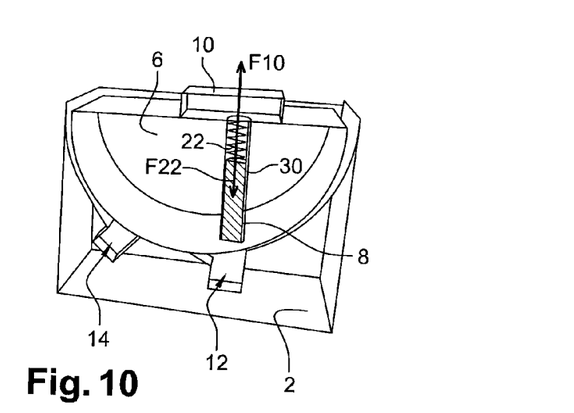
FIG. 10 is a view similar to FIG. 7 of the lockable rocker switch of FIG. 1 in the configuration of FIG. 2.
Figure 11:
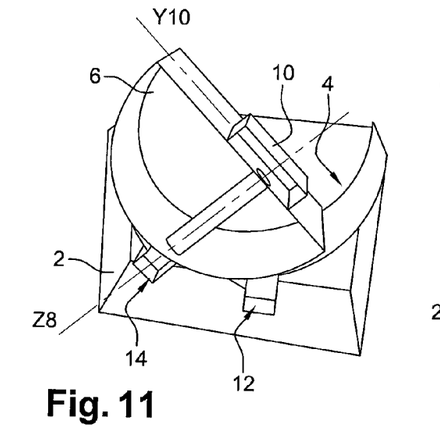
FIG. 11 is a view similar to FIG. 7 of the lockable rocker switch of FIG. 1 in the configuration of FIG. 3.
Figure 12:
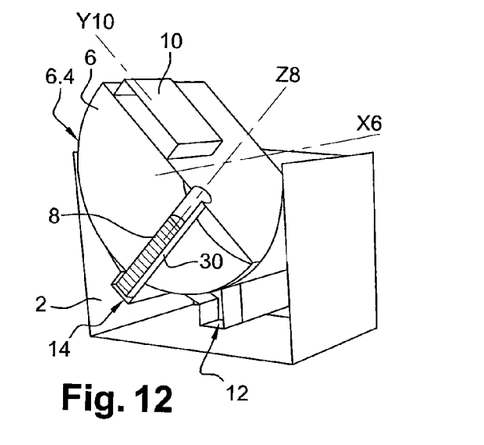
FIG. 12 is a view similar to FIG. 7 of the lockable rocker switch of FIG. 1 in the configuration of FIG. 4.

As visible on FIG. 3 or 8, rotatable part 6 includes a substantially cylindrical portion 6.4, which may have the shape of a half-cylinder around rotation axis X6. Rotatable part 6 preferably includes a substantially flat portion 6.1, which intercepts the substantially cylindrical portion 6.4.

Figure 7:
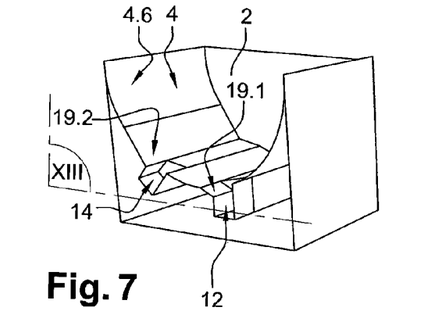
FIG. 7 is as schematic perspective view, truncated by a plane parallel to the plane of FIG. 1, of a fixed part belonging to the lockable rocker switch of FIG. 1.

As visible on FIG. 3, 4 or 7, rotation pathway 4 has a substantially concave cylindrical surface 4.6 which is suitable for rotatably bearing the cylindrical portion 6.4. The substantially concave cylindrical surface 4.6 has about the same diameter and the same width as the substantially cylindrical portion 6.4.

For instance, the substantially concave cylindrical surface 4.6 has a diameter D1, that is preferably comprised between 15 and 70 mm, more preferably between 25 and 50 mm and the substantially cylindrical portion 6.4 has a diameter D2 that is approximately equal to D1 minus a radial running clearance. The diameters and the widths are measured respectively perpendicularly and parallel to rotation axis X6.

Due to the corresponding diameters D1, D2 of the substantially concave cylindrical surface 4.6 and the substantially cylindrical portion 6.4, rotatable part 4 can rotate on fixed part 2 in a pivoting or rocking, movement along rotation pathway 4.

Lockable rocker switch 1 further includes a locking component 8 which is magnetically actuatable and which is arranged to move, with respect to fixed part 2, between a locking position (FIGS. 1, 4, 9 and 12) and a release position (FIGS. 2, 3, 10 and 11).

In the locking position (FIGS. 1, 4, 9 and 12), locking component 8 crosses rotation pathway 4 and engages both fixed part 2 and rotatable part 4 so as to prevent rotation of rotatable part 6. In other words, in the locking position, the locking component 8 protrudes partially out of the rotatable part 6 and into the fixed part 2.

In the release position (FIGS. 2, 3, 10 and 1), locking component 8 lies aside from rotation pathway 4, so that rotatable part 6 may rotate into the rotation pathway 4. To be more precise, in the release position, the locking component 8 is completely accommodated in the rotatable part 6 so as to lie aside from rotation pathway 4.

Such represented in the example of FIGS. 1 to 13, to accommodate locking component 8, the fixed part 2 may define at least two holes 12 and 14 which communicate with rotation pathway 4. The hole 12 corresponds to the first rotation position (FIGS. 1, 2, 9 and 10), while the hole 14 corresponds to the second rotation position (FIGS. 3, 4, 11 and 12).

Rotatable part 6 has a hole 30 designed to completely accommodate the locking component 8 in the release position (FIGS. 2, 3, 10 and 11), in particular, the depth of this hole 30 in rotatable part 6 is slightly bigger than the height of locking component 8.

Furthermore, the lockable rocker switch 1 includes a control component 10 which is attached to the rotatable part 6 and which is movable with respect to said rotatable part 6 between a control position (FIGS. 2, 3, 6, 10 and 11) and a rest position (FIGS. 1, 4, 5, 9 and 12).

In the control position (FIGS. 2, 3, 6, 10 and 11), the control component 10 causes a magnetic action F10 urging the locking component 8 towards its release position (FIGS. 2, 3, 10 and 11). In the rest position (FIGS. 1, 4, 5, 9 and 12), the control component 10 stops causing magnetic action F10. In normal operation of lockable rocker switch 1, the control position (FIGS. 2, 3, 6, 10 and 1) corresponds to the release position of the locking component 8, while the rest position (FIGS. 1, 4, 5, 9 and 12) corresponds to the locking position of the locking component 8.

To this end, the control component 10 can be designed such that, in the rest position, the control component 10 is too far away from the locking component 8 to exert the magnetic action F10, thus leaving the locking component 8 in its locking position (FIGS. 1, 4, 9 and 12). In particular, the materials of the control component 10 and of the locking component 8 can be selected to get the magnetic action F10 exerted only in the control position (FIGS. 2, 3, 10 and 11).

The control component 10 is designed to be manually movable between the control position (FIGS. 2, 3, 6, 10 and 11) and the rest position (FIGS. 1, 4, 5, 9 and 12). Control component 10 can be designed to form a button maneuverable by a user's hand.

Such as represented, in the example of FIGS. 1 to 13, the control component 10 is movable in translation, for instance, onto the substantially flat portion 6.1 of rotatable part 6. The control component 10 is herein movable along a rectilinear translation axis Y10 (visible on FIGS. 2, 3, 11, 12) which is orthogonal to the rotation axis X6.

The lockable rocker switch 1 further includes at least one spring 16 arranged to resiliently bias the control component 10 towards said rest position (FIGS. 1, 4, 5, 9 and 12). To this end, the spring 16 can be arranged to be more strained, say more compressed in the case of a compression spring, in the control position (FIGS. 2, 3, 6, 10 and 1) than in the rest position (FIGS. 1, 4, 5, 9 and 12). Spring 16 is herein a compression, helical spring. In the example of FIGS. 5 and 6, the control component 10 defines a hollow cavity and the spring 16 lies along the axis Y10 in this hollow cavity. One axial end of the spring 16 is attached to an inner wall of the control component 0 while its other axial end is attached to the rotatable part 6 via an attachment point 17 of the flat portion 6.1.

The lockable rocker switch 1 further includes a resilient biasing component 22 which is designed to exert a resilient action F22 (FIGS. 1, 4 and 10) suitable for moving locking component 8 into the locking position (FIGS. 1, 4, 9 and 12). The resilient action F22 is weaker than the magnetic action F10 which is exerted in the control position. Thus, resilient action F22 cannot prevent the locking component 8 from moving into the release position.

The locking component 8 is, for instance, formed by a locking pin having a substantially cylindrical shape. The hole 30 of the rotatable part 6, in which the locking pin 8 can be completely accommodated, has a corresponding substantially cylindrical shape with a diameter slightly bigger than the diameter of the locking pin in order to authorize sliding motion of the locking pin into the hole 30. The locking component 8 is arranged to translate along a lock axis Z8 and across the rotation pathway 4. The lock axis Z8 is perpendicular to the rotation axis X6. The lock axis Z8 is herein perpendicular also to the rectilinear translation axis Y10.

The control component 10 herein includes a magnetic control part preferably made of a permanent magnet and the locking component 8 includes a metallic material that is magnetically-attractable by the permanent magnet so that the control component 10 in the control position (FIGS. 2, 3, 10 and 11) exerts the magnetic action F10 on the locking component 8.

Figure 13:
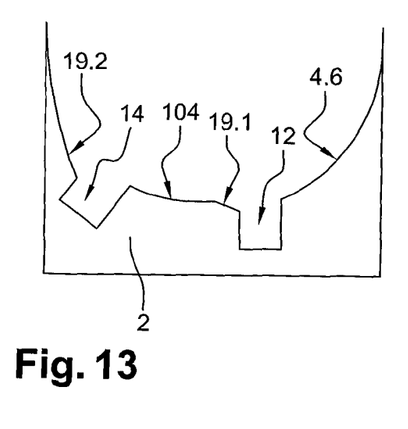
FIG. 13 is a schematic cross-sectional view taken along plane XIII at FIG. 7.
Figure 14:
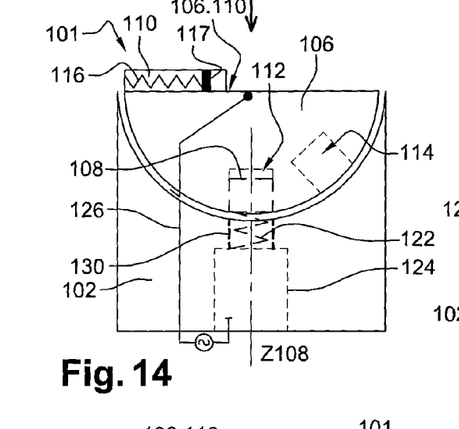
FIG. 14 is a schematic cross-sectional view, similar to FIG. 1, of a lockable rocker switch according to a second embodiment, where the rotatable part is in a first rotation position, the locking component is in a locking position and the control component is in a rest position.
Figure 15:
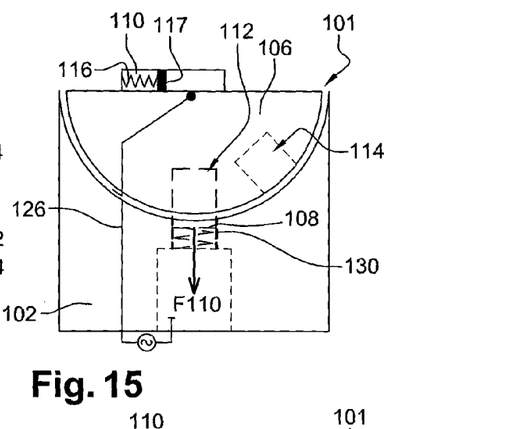
FIG. 15 is a view of the lockable rocker switch of FIG. 14, where the rotatable part is in the first rotation position, the locking component is in a releasing position and the control component is in a control position.
Figure 16:
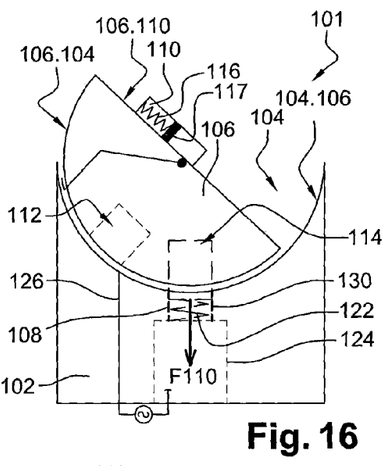
FIG. 16 is a view similar to FIG. 14 of the lockable rocker switch of FIG. 14, where the rotatable part is in the second rotation position, the locking component is in the releasing position and the control component is in the control position.
Figure 17:
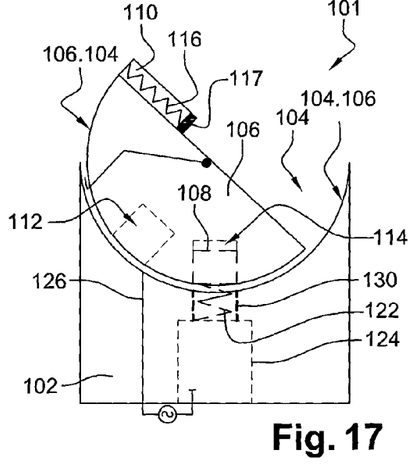
FIG. 17 is a view similar to FIG. 14 of the lockable rocker switch of FIG. 14, where the rotatable part is in a second rotation position, the locking component is in the locking position and the control component is in the rest position.
Figure 18:
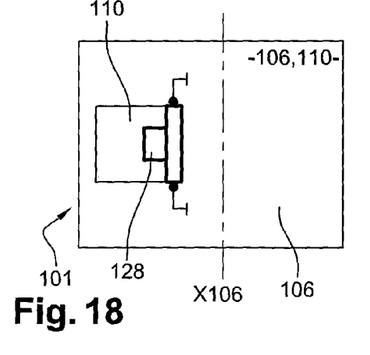
FIG. 18 is a schematic top view, taken along arrow XVIII at FIG. 14, of the lockable rocker switch of FIG. 14, where the control component is in the rest position.

As visible on FIGS. 7 and 13, in order to guide the locking component 8 move into hole 12 or 14, the substantially concave cylindrical surface 4.6 defines two guiding slopes 19.1 and 19.2. Guiding slopes 19.1 and 19.2 are visible on FIGS. 7 and 8 to 12, but they are not illustrated on schematic FIGS. 1 to 4. The guiding slope 19.1 is arranged beside hole 12 and the guiding slope 19.2 is arranged beside hole 14. The guiding slopes 19.1 and 19.2 have each a progressively increasing angle towards their respective hole 12 or 14.

FIGS. 14 to 26 illustrate a lockable rocker switch 101 according to a second embodiment. The description of the lockable rocker switch 1 given above with reference to FIGS. 1 to 13 can be transposed to the lockable rocker switch 101, with the noticeable exception of the hereafter stated difference(s).

An element of the lockable rocker switch 101 that has a structure or a function similar or corresponding to that of an element of the lockable rocker switch 1 is allotted the same reference numeral plus 100. One can thus define a fixed part 102, a rotatable part 106, a rotation pathway 104, a rotation axis X106, a locking component 108 with a lock axis Z108, a control component 10 with a rectilinear translation axis Y110, suitable for triggering and causing a magnetic action F110, a substantially cylindrical portion 106.104 and a substantially flat portion 106.110 on the rotatable part 106, a substantially concave cylindrical surface 104.106 on the fixed part 102, a spring 116 to resiliently bias the control component 110 towards said rest position and a resilient biasing component 122 designed to exert a resilient action on the locking component 108 to move it towards the locking position when the control component 10 is in the rest position (FIGS. 14, 17, 18, 22, 25).

FIGS. 15, 16, 23 and 24 illustrate the release position of the locking component 108 and the control position of the control component 110. FIGS. 14, 17, 22 and 25 illustrate the locking position of the locking component 108 and the rest position of the control component 110.

The lockable rocker switch 101 differs from the lockable rocker switch 1, because the locking component 108 in its release position (FIGS. 15, 16, 23 and 24) is completely accommodated in a cavity 130 of the fixed part 102, whereas, in the first embodiment, the locking component 8 in its release position (FIGS. 2, 3, 10 and 11) is completely accommodated in the rotatable part 6.

Conversely, the lockable rocker switch 101 differs from the lockable rocker switch 1, because the locking component 108 in its locking position (FIGS. 14, 17, 22 and 25) protrudes partially out of the fixed part 102 and into the rotatable part 106, whereas, in the first embodiment, locking component 8 in the locking position (FIGS. 1, 4, 9 and 12) protrudes partially out of the rotatable part 6 and into the fixed part 2.

Likewise, the lockable rocker switch 101 differs from the lockable rocker switch 1, because the rotatable part 106 defines at least two cavities 112 and 114 which communicate with the rotation pathway 104, whereas the fixed part 2 defines at least two holes 12 and 14 which communicate with the rotation pathway 4. In the lockable rocker switch 101, cavity 112 corresponds to the first rotation position (FIGS. 14, 15, 22 and 23) and cavity 114 corresponds to the second rotation position (FIGS. 16, 17, 24 and 25).

Conversely, the lockable rocker switch 101 differs from the lockable rocker switch 1, because the locking component 108 in its release position (FIGS. 15, 16, 23 and 24) is completely accommodated in the fixed part 102, and the locking component 108 in its locking position (FIGS. 14, 17, 22 and 25) protrudes partially out of the fixed part 02 and into one cavity 12 or 114; whereas the locking component 8 in the locking position (FIGS. 1, 4, 9 and 12) protrudes partially out of rotatable part 6 and into hole 12 or 14.

Figure 21:
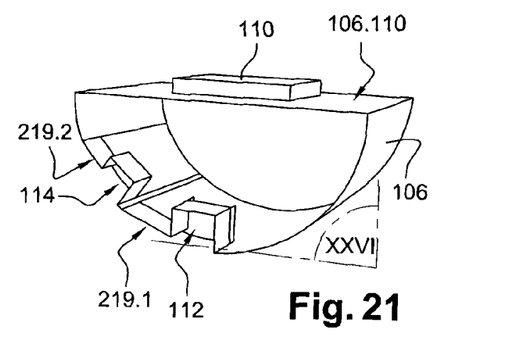
FIG. 21 is a view similar to FIG. 8 of a rotatable part and a control component belonging to the lockable rocker switch of FIG. 14.
Figure 22:
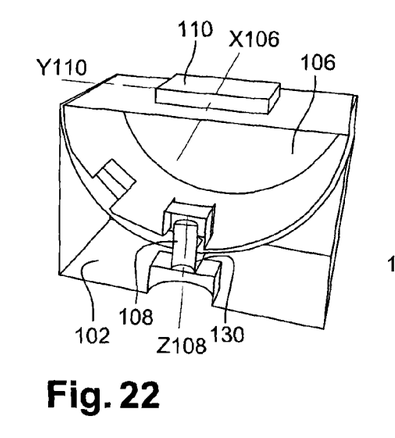
FIG. 22 is a view similar to FIG. 9 of the lockable rocker switch of FIG. 14 in the configuration of FIG. 14.
Figure 23:
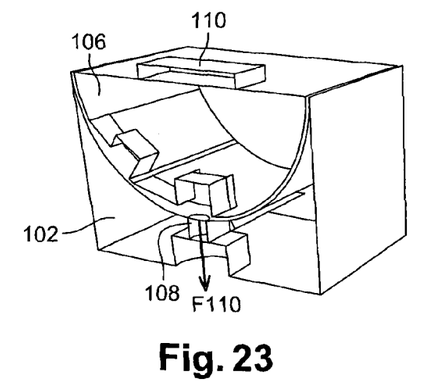
FIG. 23 is a view similar to FIG. 9 of the lockable rocker switch of FIG. 14 in the configuration of FIG. 15.
Figure 24:
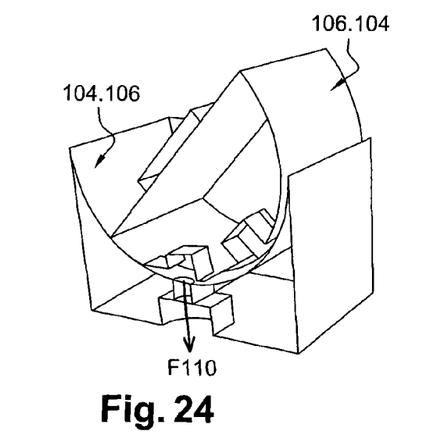
FIG. 24 is a view similar to FIG. 9 of the lockable rocker switch of FIG. 14 in the configuration of FIG. 16.
Figure 25:
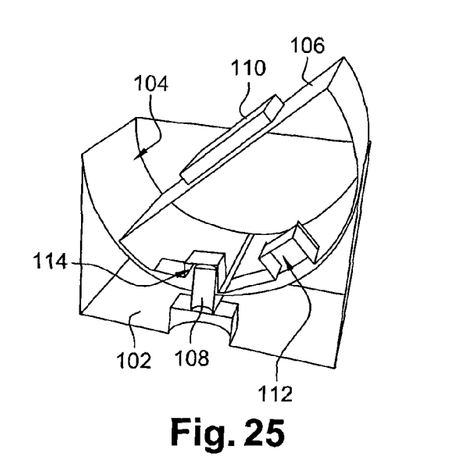
FIG. 25 is a view similar to FIG. 9 of the lockable rocker switch of FIG. 14 in the configuration of FIG. 17.
Figure 26:
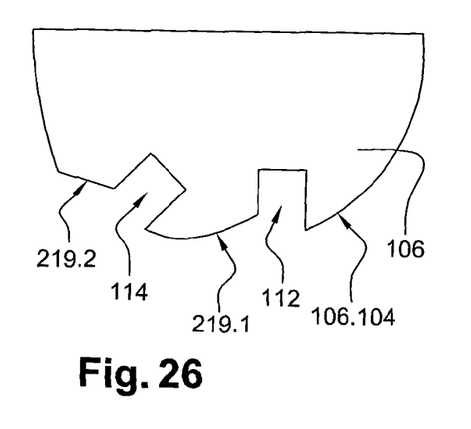
FIG. 26 is a schematic cross-sectional view taken along plane XXVI at FIG. 21.

Besides, the lockable rocker switch 101 differs from the lockable rocker switch 1, because, as visible on FIGS. 21 and 26, the substantially cylindrical portion 104.106 defines two guiding slopes 219.1 and 219.2 which are arranged respectively beside cavities 12 and 114 and which have each a progressively increasing angle towards their respective cavity 112 or 114. Guiding, slopes 219.1 and 219.2 are visible on FIGS. 21 to 25, but they are not illustrated on schematic FIGS. 14 to 17.

Furthermore, the lockable rocker switch 101 differs from the lockable rocker switch 1, because the lockable rocker switch 101 includes an electromagnetic solenoid 124 which is arranged for exerting a magnetic action F110 on the locking component 108 when the electromagnetic solenoid 124 is electrically energized. The magnetic action exerted by the electromagnetic solenoid 124 when energized is stronger than the action exerted by the resilient biasing component 122. The resilient biasing component 122 and the electromagnetic solenoid 124 are represented on FIGS. 14 to 7, but not on FIGS. 20 to 25 for the sake of clarity.

The lockable rocker switch 101 includes a control circuit 126 which is connected to the electromagnetic solenoid 124. The control circuit 126 extends in the rotatable part 106 in such a manner that it can cooperate with the control component 110 to electrically energize said electromagnetic solenoid 124 when the control component 110 is in the control position. When the control component is in the control position, the control component 110 allows the control circuit 126 to energize the electromagnetic solenoid 124. The control component 10 in the control position triggers and therefore causes the magnetic action that urges said locking component towards said release position against the opposite action exerted by the resilient biasing component 122.

The electromagnetic solenoid 124 is accommodated into the fixed part 2. As visible on FIGS. 14 to 17, the control circuit 126 further extends onto the rotation pathway 104 and into the fixed part 02 in electrical contact with the electromagnetic solenoid 124. Besides, the electromagnetic solenoid 124 includes a core including a magnetic material herein composed of a ferromagnetic material such as a soft ferrous magnetic material, for instance, iron or soft steel.

Figure 19:
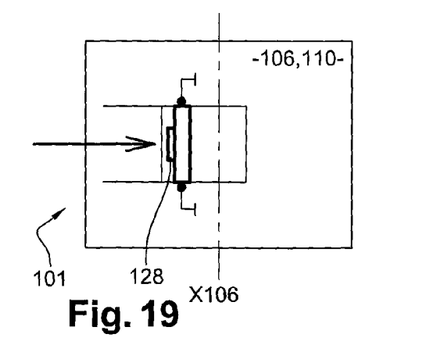
FIG. 19 is view similar to FIG. 18 of the lockable rocker switch of FIG. 14, where the control component is in a control position.
Figure 20:
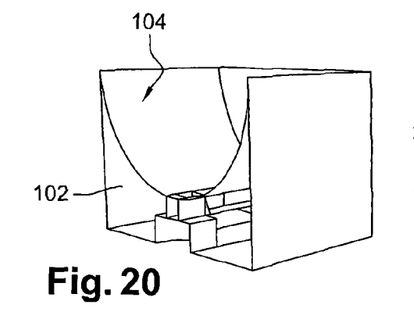
FIG. 20 is a schematic perspective view, similar to FIG. 7, truncated by a plane parallel to the plane of FIG. 1, of a fixed part belonging to the lockable rocker switch of FIG. 14.

The control component 110 is designed to close said control circuit 126 when it is in the control position (FIGS. 15, 16, 19, 23 and 24). The rotatable part 06 may, for instance, include a microswitch 128 which is arranged to activate control circuit 126 when control component 110 is in control position (FIG. 19). In a variant (not represented) the control component 110 forms an electric switch that comprises a metallic part arranged on the control component 110 so that, in the control position, the control circuit 126 is closed by the metallic part.

Figures 27, 28, 29, 30:
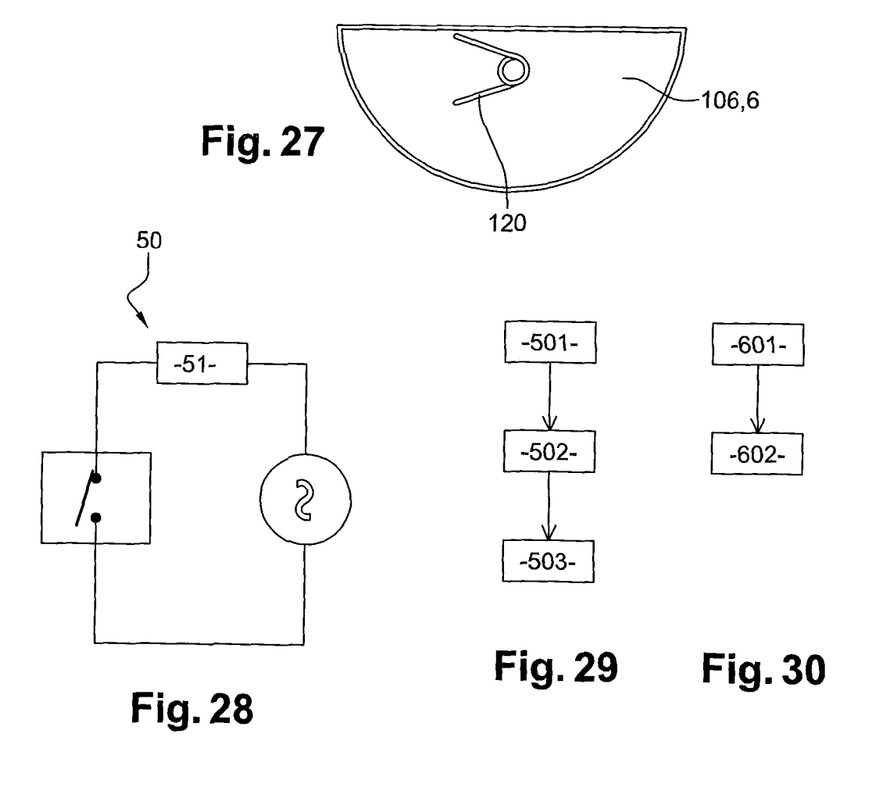
FIG. 27 is a schematic cross-sectional view of a rotatable part of a lockable rocker switch as represented on FIGS. 1 to 26.
FIG. 28 is a schematic view of an electrical circuit according to the present invention including a lockable rocker switch a lockable rocker switch as illustrated on any one of FIGS. 1 to 26.
FIG. 29 is a schematic flow sheet illustrating an unlocking method involving a lockable rocker switch as illustrated on any one of FIGS. 1 to 26.
FIG. 30 is a schematic flow sheet illustrating a locking method involving a lockable rocker switch as illustrated on any one of FIGS. 1 to 26.

As visible on FIG. 27, the lockable rocker switches 1, 101 of the first and second embodiments 101 may further include a rocker spring 120 which is arranged to resiliently bias the rotatable part 6, 106 towards its first rotation position (FIGS. 1, 2, 9, 10, 14, 15, and 23). In other words, when the user releases the rotatable part 6, 106, the rocker spring 120 automatically brings it back to the first rotation position. Without such a rocker spring, the user shall push on the rotatable part 6, 106 in order to bring it back to the first rotation position.

FIG. 28 illustrates an electrical circuit 50, for supplying power to at least one electrical component 51 of a motor vehicle. The electrical circuit 50 includes the lockable rocker switch 1 arranged so that the rotatable part 6 in the first rotation position triggers current supply in the electrical circuit 50 and that the rotatable part 6 in the second rotation position stops triggering current supply in the electrical circuit 50. Alternatively, the electrical circuit 50 could include the lockable rocker switch 101 instead of lockable rocker switch 1. In another alternative, the rotatable part 6, 106 in the second rotation position triggers current supply in the electrical circuit 50 and the rotatable part 6, 106 in the first rotation position stops triggering current supply in the electrical circuit 50. The lockable rocker switch 1 or 101 can be used, for instance, as an ignition lock or as an ADR switch lock.

As illustrated on FIG. 29, in operation, an unlocking method for unlocking the lockable rocker switch 1 or 101 comprises the steps of:
  501) manually moving the control component 10 or 10 from the rest position (FIGS. 1, 4, 9, 12, 14, 17, 18, 21, 22, 25) to the control position (FIGS. 2, 3, 10, 11, 15, 16 19, 23 and 24).
  502) magnetically actuating (F10, F110) the locking component 8 or 108 so as to move it with respect to the fixed part 2 or 102 from its locking position to its release position; this shall be made against the biasing force of spring 22, 122;
  503) rotating the rotatable part 6 or 106 along the rotation pathway 4 or 104 about rotation axis X6, X106 and between the first rotation position (FIGS. 3, 4, 9, 10, 16, 17, 24 and 25) and the second rotation position (FIGS. 1, 2, 11, 12, 14, 15, 22, 23).

As illustrated on FIG. 30, in operation, a locking method for locking the lockable rocker switch 1 or 101 comprises the steps of:
  601) moving said control component 10, 110 from said control position to said rest position;
  602) letting said locking component 8, 108 returning back to said at least one locking position.

In step 601) control component 10, 110 can be moved from said control position to said rest position by a manual action or due to the biasing force generated by the spring 16 or 116 when such a spring, is provided.

The invention claimed is:

1. Lockable rocker switch including at least:
  a fixed part defining a rotation pathway;
  a rotatable part arranged to rotate along the rotation pathway at least between a first rotations position rotation position about a rotation axis;
  a locking component which is magnetically actuatable and which is arranged to move, with respect to the fixed part, between:
    at least one position, in which the locking component crosses the rotation pathway and engages both the fixed part and the rotatable part so as to prevent rotation of the rotatable part ,and
    at least one release position, in which the locking component lies aside from the rotation pathway, so that the rotatable part may rotate into the rotation pathway;
  wherein the lockable rocker switch further includes a control component which is attached to the rotatable part and which is movable with respect to the rotatable part at least between:
    a control position, in which the control component causes a magnetic action the locking component towards the release position, and
    a rest position, in which the control component stops causing the magnetic action.

2. The lockable rocker switch according to claim 1, wherein the locking component in the release position is completely accommodated in the rotatable part, and wherein the locking component in the locking position protrudes partially out of the rotatable part and into the fixed part.

3. Lockable rocker switch according to claim 2, wherein the fixed part defines at least: one hole which communicates with the rotation pathway (4), the rotatable part defines at least one other hole, the locking component in the release position being completely accommodated in the at least one other hole, and the locking component in the locking position protrudes partially out of the rotatable part and into the at least one hole of the fixed part.

4. Lockable rocker switch according to claim 3, wherein the fixed part defines at least two holes corresponding to the first rotation position and to the second rotation position.

5. Lockable rocker switch according to claim 1, wherein the locking component in the release position is arranged to be completely accommodated in the fixed part, and wherein the locking component in the locking position protrudes partially out of the fixed part and into the rotatable part.

6. Lockable rocker switch according to claim 5, wherein the rotatable part defines at least one cavity which communicates with the rotation pathway, the fixed part defines at least one other cavity, the locking component in the release position being completely accommodated in the at least one other cavity formed in the fixed part, and the locking component in the locking position protrudes partially out of the fixed part and into the at least one cavity of the rotatable part.

7. Lockable rocker switch according to claim 6, wherein the rotatable part defines at least two cavities corresponding to the first rotation position and to the second rotation position.

8. Lockable rocker switch according to claim 1, wherein the control component is designed to be manually movable at least between the control position and the rest position.

9. Lockable rocker switch according to claim 1, further including at least one spring arranged to resiliently bias the control component towards the rest position.

10. Lockable rocker switch according to claim 1, wherein the control component is movable in translation.

11. Lockable rocker switch according to claim 10, wherein the rotatable part has a substantially flat portion the control component being movable onto the substantially flat portion (6.10; 106.110) and along a rectilinear translation axis.

12. Lockable rocker switch according to claim 11, wherein the rectilinear translation axis is orthogonal to the rotation axis.

13. Lockable rocker switch according to claim 1, wherein the rotatable part includes a substantially cylindrical portion, which has preferably the shape of a half-cylinder, and wherein the rotation pathway has a substantially concave cylindrical surface suitable for rotatably bearing the cylindrical portion.

14. Lockable rocker switch according to claim 13, wherein the substantially concave cylindrical surface defines at least one guiding slope which is arranged beside a respective hole of the fixed part and which has a progressively increasing angle or curvature towards a respective hole, wherein the locking component in the release position is completely accommodated in the rotatable part, and wherein the locking component in the locking position protrudes partially out of the rotatable part and into the fixed part, wherein the fixed part defines at least one hole which communicates with the rotation pathway, the rotatable part defines at least one other hole, the locking component in the release position being completely accommodated in the at least one other hole, and the locking component in the locking position protrudes partially out of the rotatable part and into the at least one hole of the fixed part.

15. Lockable rocker switch according to claim 13, wherein the substantially cylindrical portion defines at least one guiding slope which is arranged beside a respective cavity of the rotatable part and which has a progressively increasing angle or curvature towards a respective cavity, wherein the locking component in the release position is arranged to be completely accommodated in the fixed part, wherein the locking component in the locking position protrudes partially out of the fixed part and into the rotatable part, and wherein the rotatable part defines at least one cavity which communicates with the rotation pathway, the fixed part defines at one other cavity, the locking component in the release position being completely accommodated in the at least one other cavity formed in the fixed part, and the locking component in the locking position protrudes partially out of the fixed part and into the at least one cavity of the rotatable part.

16. Lockable rocker switch according to claim 1, further including at least one rocker spring arranged to resiliently bias the rotatable part towards the first rotation position.

17. Lockable rocker switch according to claim 1, further including a resilient biasing component designed to exert a resilient action suitable for moving the locking component into the at least one locking position, the resilient action being weaker than the magnetic action.

18. Lockable rocker switch according to claim 1, wherein the locking component is arranged to translate along a lock axis and across the rotation pathway, the lock axis being preferably perpendicular to the rotation axis and the locking component preferably including a pin with a substantially cylindrical shape.

19. Lockable rocker switch according to claim 1, wherein the locking component includes a magnetic locking part made of a metallic material, for instance steel alloy, and the control component includes a magnetic, control part made of a magnetic material, preferably a permanent magnet, so that the control component in the control position exerts the magnetic action on the locking component.

20. Lockable rocker switch according to claim 1, wherein the lockable rocker switch further includes an electromagnetic solenoid arranged, when electrically energized for exerting the magnetic action on said the locking component, and wherein the lockable rocker switch further includes a control circuit connected to the electromagnetic solenoid and extending at least in the rotatable part in such a manner that it cooperate with the control component to electrically energize the electromagnetic solenoid when the control component is in the control position.

21. Lockable rocker switch according to claim 20, wherein the electromagnetic solenoid is accommodated into the fixed part, the control circuit further extending onto the rotation pathway and into the fixed part in electrical contact with the electromagnetic solenoid.

22. Lockable rocker switch according to claim 21, wherein the electromagnetic solenoid includes a core including a ferromagnetic material such as a soft ferrous magnetic material.

23. Lockable rocker switch according to claim 20, wherein the control component is designed to close the control circuit in the control position.

24. Lockable rocker switch according to claim 23, wherein the control circuit includes a microswitch arranged in the rotatable part such that it is activated by the control component to electrically close the control circuit in order to energize the electromagnetic solenoid when the control component is in the control position.

25. Lockable rocker switch according to claim 1, wherein the rotatable part is arranged to rotate into the rotation pathway between at least three rotation positions about the rotation axis, including the first rotation position and the second rotation position.

26. Electrical circuit, for supplying power to at least one electrical component of a motor vehicle wherein the electrical circuit includes a lockable rocker switch according to claim 1, the lockable rocker switch being arranged so that the rotatable part in the first rotation position triggers current supply in the electrical circuit and that the rotatable part in the second rotation position stops triggering current supply in the electrical circuit.

27. Unlocking method for unlocking a lockable rocker switch according to claim 1, the unlocking method comprising the steps of:
  manually moving the control component from the rest position to the control position;
  magnetically actuating the locking component so as to move the locking component with respect to the fixed part from the at least one locking position to the at least one release position; and
  rotating the rotatable part along the rotation pathway at least between a first rotation position and a second rotation position about a rotation axis.

28. Locking method for locking a lockable rocker switch according to claim 1, the locking method comprising the steps of:
  moving the control component from the control position to the rest position;
  letting the locking component returning back to the at least one locking position.

* * * * *